US012017449B2

(12) United States Patent
Kashiwabara et al.

(10) Patent No.: US 12,017,449 B2
(45) Date of Patent: Jun. 25, 2024

(54) MEDIUM SUPPLYING DEVICE AND RECORDING DEVICE

(71) Applicant: SEIKO EPSON CORPORATION, Tokyo (JP)

(72) Inventors: Kazutoshi Kashiwabara, Shiojiri (JP); Junki Akama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/933,009

(22) Filed: Sep. 16, 2022

(65) Prior Publication Data

US 2023/0091312 A1 Mar. 23, 2023

(30) Foreign Application Priority Data

Sep. 17, 2021 (JP) ................................ 2021-151844

(51) Int. Cl.
*B41J 15/04* (2006.01)
*B65H 16/02* (2006.01)
*B65H 20/06* (2006.01)
*B65H 23/182* (2006.01)

(52) U.S. Cl.
CPC ............ *B41J 15/046* (2013.01); *B65H 20/06* (2013.01); *B65H 23/182* (2013.01)

(58) Field of Classification Search
CPC ....... B65H 16/028; B41J 15/04; B41J 15/048; B41J 15/046; G03G 2215/00455
See application file for complete search history.

(56) References Cited

U.S. PATENT DOCUMENTS

| | | | | |
|---|---|---|---|---|
| 3,779,473 A * | 12/1973 | Edrinn | B65H 16/02 | 242/566 |
| 5,376,959 A * | 12/1994 | Rall | B41J 15/04 | 347/3 |
| 5,893,530 A * | 4/1999 | Alexander, III | B65H 16/106 | 242/564.5 |
| 6,126,343 A * | 10/2000 | Sugiyama | B41J 3/4075 | 400/613 |
| 2020/0262220 A1* | 8/2020 | Kinoshita | B65H 23/1825 | |

FOREIGN PATENT DOCUMENTS

| | | | | |
|---|---|---|---|---|
| DE | 19734831 B4 * | 9/2004 | B65H 18/16 |
| JP | 2020-132364 A | 8/2022 | |

* cited by examiner

*Primary Examiner* — Daniel J Colilla
(74) *Attorney, Agent, or Firm* — WORKMAN NYDEGGER

(57) ABSTRACT

A medium supplying device includes a housing part configured to house a rolled medium obtained by winding a sheet, a pair of rollers disposed at a predetermined interval in the housing part, and a supplying belt with an endless annular shape provided around the pair of rollers and configured to rotate along with rotation of the pair of rollers. An outer peripheral surface of the rolled medium is supported with the supplying belt, and the supplying belt is driven into rotation to rotate the rolled medium to supply the sheet.

12 Claims, 8 Drawing Sheets

MEDIUM SUPPLYING DEVICE AND RECORDING DEVICE

The present application is based on, and claims priority from JP Application Serial Number 2021-151844, filed Sep. 17, 2021, the disclosure of which is hereby incorporated by reference herein in its entirety.

BACKGROUND

1. Technical Field

The present disclosure relates to a medium supplying device and a recording device.

2. Related Art

In the related art, as disclosed in JP-A-2020-132364, a conveyance device in which a roll body is supported with a driving roller and a driven roller, and the driving roller is driven to rotate the roll body and feed the medium from the roll body is known.

In the conveyance device disclosed in JP-A-2020-132364, however, the outer peripheral surface of the roll body is pressed against the driving roller and the driven roller. As such, for example, in the case of special paper in which an ink receptive layer is provided on the surface of the medium, the ink receptive layer is disadvantageously depressed by the pressure of the roller.

When the receptive layer of the medium is depressed, the reflectance of that portion changes and results in a streaked roller track, thus reducing the image quality.

SUMMARY

A medium supplying device includes a housing part configured to house a rolled medium obtained by winding a sheet, a pair of rollers disposed at a predetermined interval in the housing part, and a supplying belt with an endless annular shape provided around the pair of rollers and configured to rotate along with rotation of the pair of rollers. An outer peripheral surface of the rolled medium is supported with the supplying belt, and the supplying belt is driven into rotation to rotate the rolled medium to supply the sheet.

A recording device includes the above-described medium supplying device, and a recording part configured to perform recording on a sheet supplied from the medium supplying device.

DESCRIPTION OF EXEMPLARY EMBODIMENTS

1. First Embodiment

First, a configuration of a recording device 10 is described. The recording device 10 of this embodiment is a serial-recording type ink-jet printer.

Figure 1:
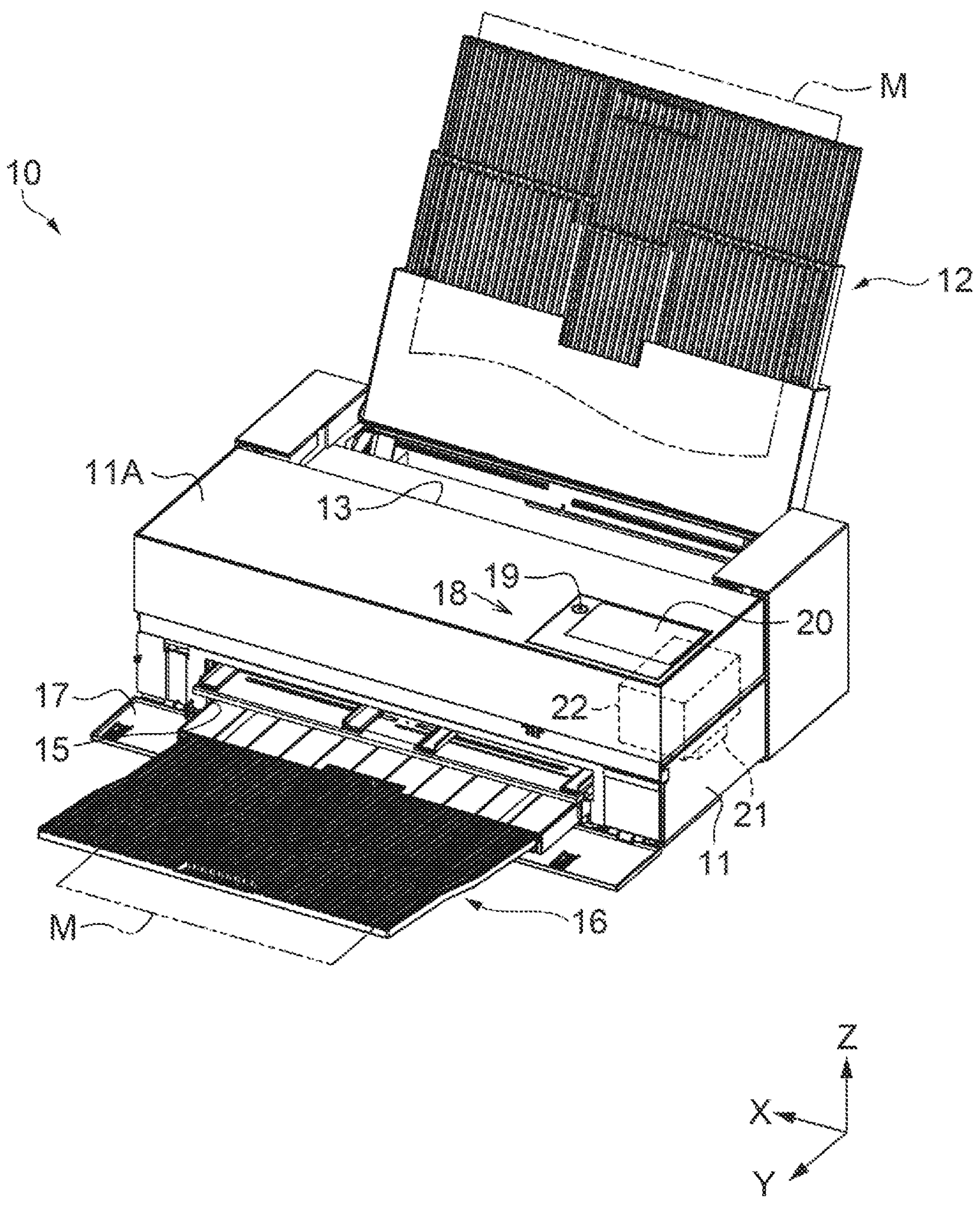
FIG. 1 is a perspective view illustrating a configuration of a recording device according to a first embodiment.

As illustrated in FIG. 1, the recording device 10 includes a substantially cuboid housing 11. A supplying tray 12 where a medium M (e.g., a sheet) before the recording can be set is provided at a top surface 11A, in the +Z direction, of the housing 11 of the recording device 10. The medium M set at the supplying tray 12 is supplied into the housing 11 of the recording device 10 through a supplying port 13. The supplying tray 12 can be opened and closed with respect to the supplying port 13. Note that the supplying tray 12 of this embodiment has a three-stage structure, and configured to be extendable.

An ejection port 15 for ejecting the medium M recorded by the recording device 10 and an ejection tray 16 for loading the recorded medium M ejected from the ejection port 15 are provided at the front part, in the +Y direction, of the housing 11. An openable cover 17 is provided at a lower portion of the front surface of the housing 11 of the recording device 10, and the ejection tray 16 housed in the housing 11 of the recording device 10 is covered with the cover 17 in the closed state. Note that the ejection tray 16 of this embodiment has a three-stage structure, and configured to be extendable.

An operation panel 18 is provided at the top surface 11A of the housing 11. The operation panel 18 includes an operation part 19 such as a power button, and a display part 20 composed of a liquid crystal display and the like. Menus, various messages and the like are displayed on the display part 20. The recording device 10 is communicatively connected to the host device (not illustrated). When receiving recording data from the host device, the recording device 10 supplies the medium M set at the supplying tray 12 by using a supplying mechanism (not illustrated), and performs a recording operation of recording an image based on the recording data on the supplied medium M.

In the housing 11, a recording head 21 serving as a recording part that ejects liquid such as ink to the medium M, and a carriage 22 in which the recording head 21 is mounted, are provided. The carriage 22 moves back and forth in the direction along the X axis (scanning direction) orthogonal to the conveyance direction of the medium M. The carriage 22 alternately performs a recording operation of recording for one path through discharge of droplets from the recording head 21 in the process of moving along the scanning direction, and a conveying operation of conveying the medium M to the next recording position, and thus images, documents and/or the like are recorded on the medium M and/or a sheet MB of a rolled medium MA described later.

In addition, a mounting part where a liquid container such as an ink cartridge that stores the liquid used for the recording is detachably mounted (each of which is not illustrated in the drawing) is provided in the housing 11. Note that the liquid container may be of an off-carriage type that is disposed at a position different from the carriage 22, or the liquid container may be of an on-carriage type that is detachably mounted to the carriage 22. In addition, the recording device 10 is not limited to the serial-recording type, and may be of a line recording type in which the recording head 21 is a long line head disposed over the maximum width of the medium M and capable of discharging droplets simultaneously over the entire width of the medium M.

Figure 2:
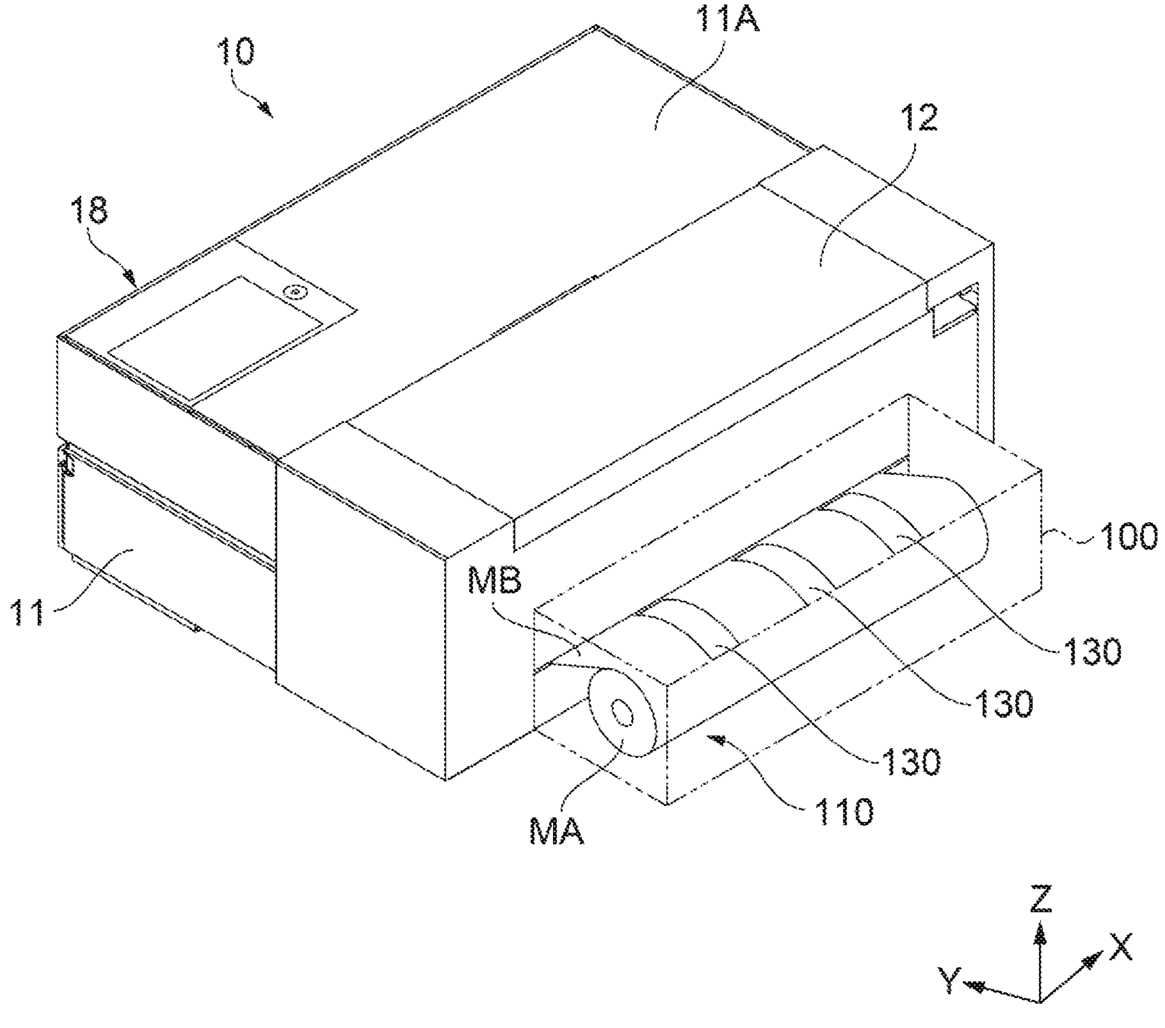
FIG. 2 is a perspective view illustrating a configuration of a medium supplying device according to the first embodiment.

The recording device 10 of this embodiment is configured to be capable of performing recording on the rolled medium MA composed of the wound long sheet MB. More specifically, as illustrated in FIG. 2, a medium supplying device 100 that houses the rolled medium MA and supplies the sheet MB is disposed at the rear part, in the −Y direction, of the housing 11 of the recording device 10. The rolled medium MA set at the medium supplying device 100 is supplied as the sheet MB into the housing 11, and an image based on the recording data is recorded on the supplied sheet MB.

Note that the medium supplying device 100 may be configured to be detachable from the recording device 10, or may be integrated with the recording device 10.

A configuration of the medium supplying device 100 is described below.

Figure 3:
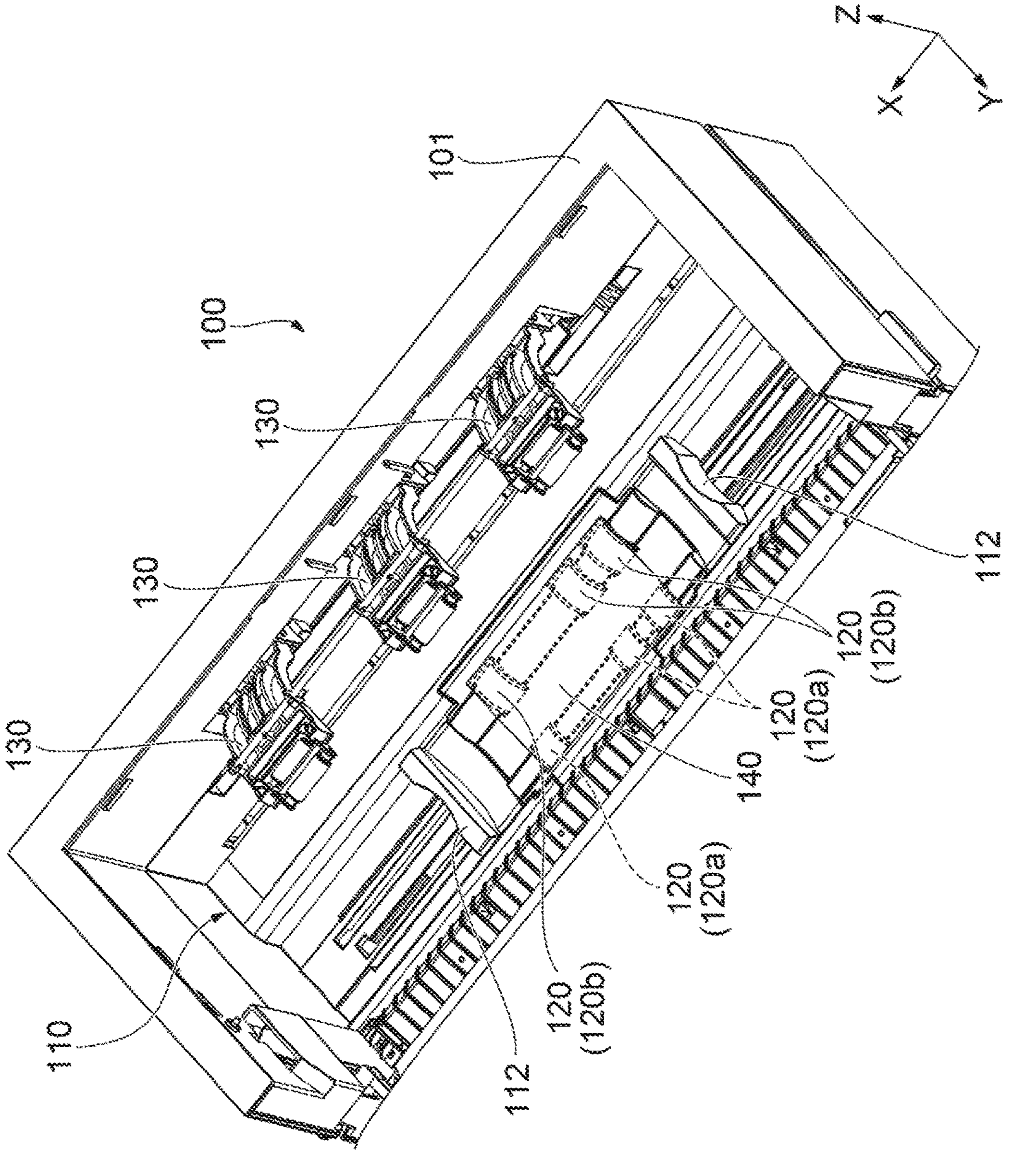
FIG. 3 is a perspective view illustrating a configuration of the medium supplying device according to the first embodiment.
Figure 4:
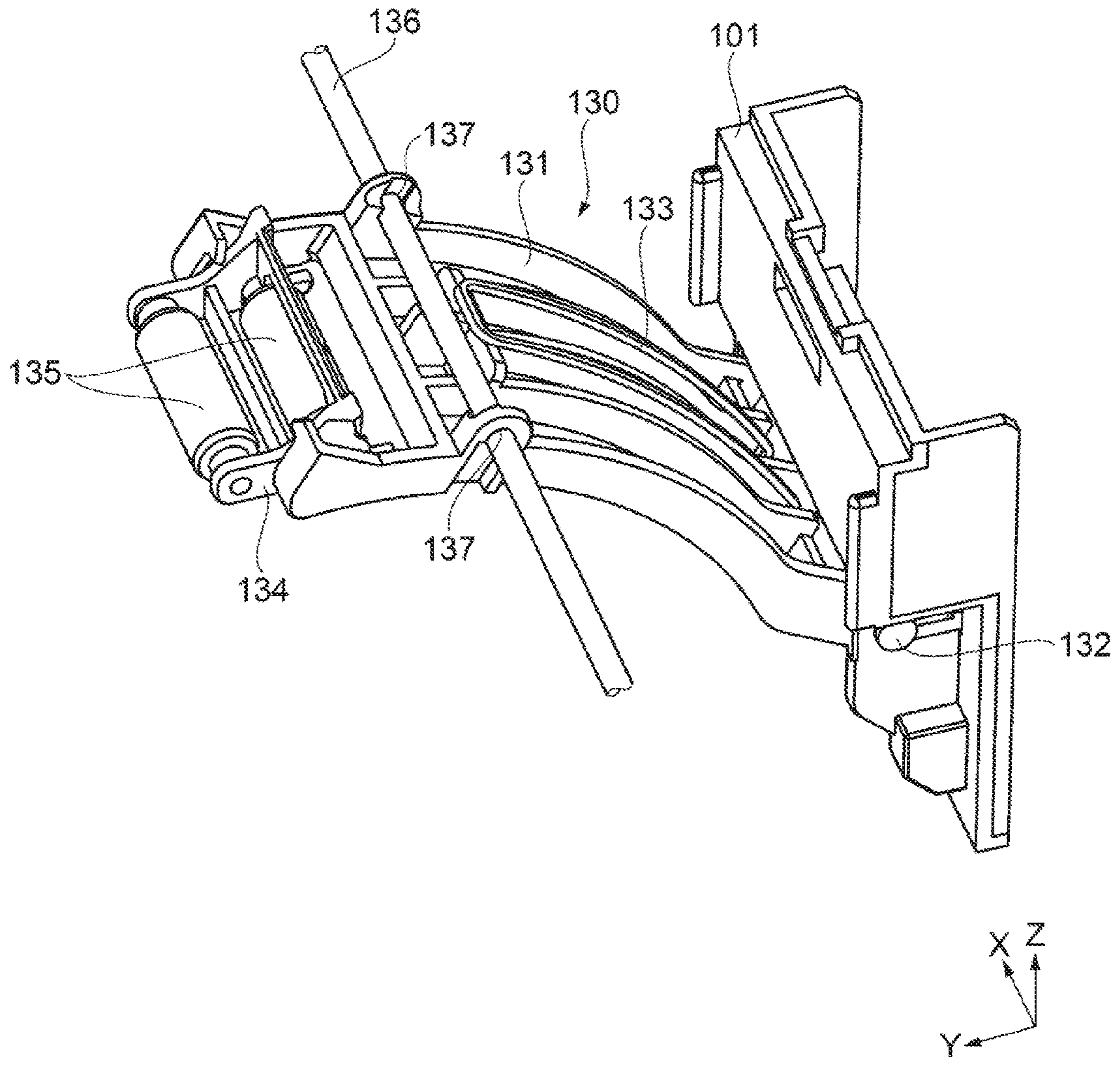
FIG. 4 is a perspective view illustrating a configuration of a contact member according to the first embodiment.

As illustrated in FIGS. 2, 3, and 4, the medium supplying device 100 includes a housing part 110 that houses the rolled medium MA, a pair of rollers 120 disposed at a predetermined interval in the Y-axis direction in the housing part 110, and an endless annular supplying belt 140 provided around the pair of rollers 120 to rotate along with the rotation of the pair of rollers 120.

The medium supplying device 100 includes a housing 101, and the housing part 110 is disposed in the housing 101. In the housing part 110, the rolled medium MA is housed with the longitudinal direction (roll axial direction) of the rolled medium MA aligned with the direction along the X axis.

Figure 5A:
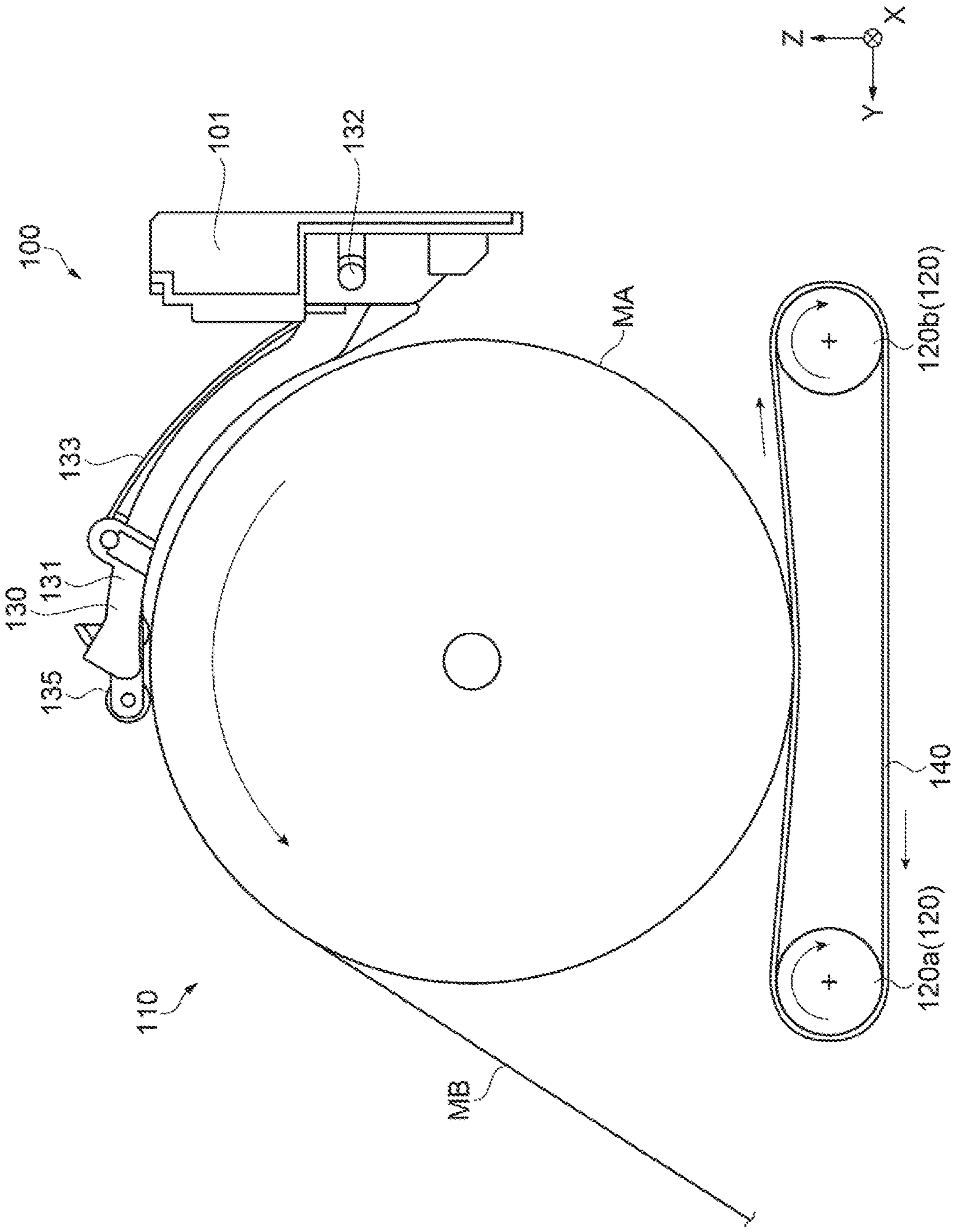
FIG. 5A is a schematic view illustrating a configuration of the medium supplying device according to the first embodiment.

The pair of rollers 120 is disposed at a lower portion in the housing part 110. The pair of rollers 120 of this embodiment is composed of a first roller 120*a* and a second roller 120*b*. The diameter of the first roller 120*a* and the diameter of the second roller 120*b* have the same size. The shafts of the first roller 120*a* and the second roller 120*b* are disposed in the direction along the X axis. The first roller 120*a* is disposed on the +Y direction side of the second roller 120*b*. A plurality of the first rollers 120*a* are disposed in the axial direction. Likewise, a plurality of the second rollers 120*b* are disposed in the axial direction. The first roller 120*a* and the second roller 120*b* are disposed to sandwich the core of the supported rolled medium MA in the horizontal direction (FIG. 5A).

The supplying belt 140 is a rubber member, and is stretched around the first roller 120*a* and the second roller 120*b*. The supplying belt 140 makes contact with the outer peripheral surface of the rolled medium MA, and supports the rolled medium MA. The supplying belt 140 is not limited the rubber member, as long as it has a surface friction and flexibility equivalent to those of the rubber member.

At least one of the first roller 120*a* and the second roller 120*b* is a driving roller, and when the driving roller is driven, the supplying belt 140 is driven into rotation, thus rotating the rolled medium MA. In this embodiment, both the first roller 120*a* and the second roller 120*b* are driving rollers. The sheet MB fed along with the rotation of the rolled medium MA is supplied into the housing 11 of the recording device 10.

In addition, in the housing part 110, an edge guide 112 that can sandwich the end portions of the housed rolled medium MA in the longitudinal direction is provided. The edge guide 112 is disposed on the −X direction side and the +X direction side at a lower portion in the housing part 110. The edge guide 112 includes a guide part with a shape protruding in the +Z direction from the lower portion of the housing part 110. The edge guide 112 defines the supporting position of the rolled medium MA by making contact with both end portions of the rolled medium MA in the longitudinal direction in such a manner as to sandwich the rolled medium MA supported by the supplying belt 140.

The edge guide 112 is movable in the direction along the X axis and adaptable to the various longitudinal sizes of the rolled medium MA to be supported.

In addition, a contact member 130 that makes contact with the outer peripheral surface of the rolled medium MA supported by the supplying belt 140 is disposed in the housing part 110 of the medium supplying device 100. The contact member 130 makes contact with the outer peripheral surface of the rolled medium MA from the position opposite to the position where the outer peripheral surface of the rolled medium MA is supported by the supplying belt 140. In this embodiment, the outer peripheral surface of the lower portion of the rolled medium MA is supported by the supplying belt 140, and the outer peripheral surface of the upper part of the rolled medium MA makes contact with the contact member 130 (FIG. 5A).

The contact member 130 is displaceable in the vertical direction, and presses the rolled medium MA housed in the housing part 110 from above. The contact member 130 is a member protruding from the end portion of the housing 101 in the −Y direction toward the +Y direction. The contact member 130 includes a main body part 131 with an arcuate shape (arch shape) that matches the external shape of the housed rolled medium MA. In this manner, when the contact member 130 presses the rolled medium MA from above, the interference between the contact member 130 and the rolled medium MA can be prevented.

In addition, a plurality of (in this embodiment, three) contact members 130 are provided along the X axis. The contact members 130 are disposed at even intervals. In this manner, the rolled medium MA can be reliably pressed.

Figure 5B:
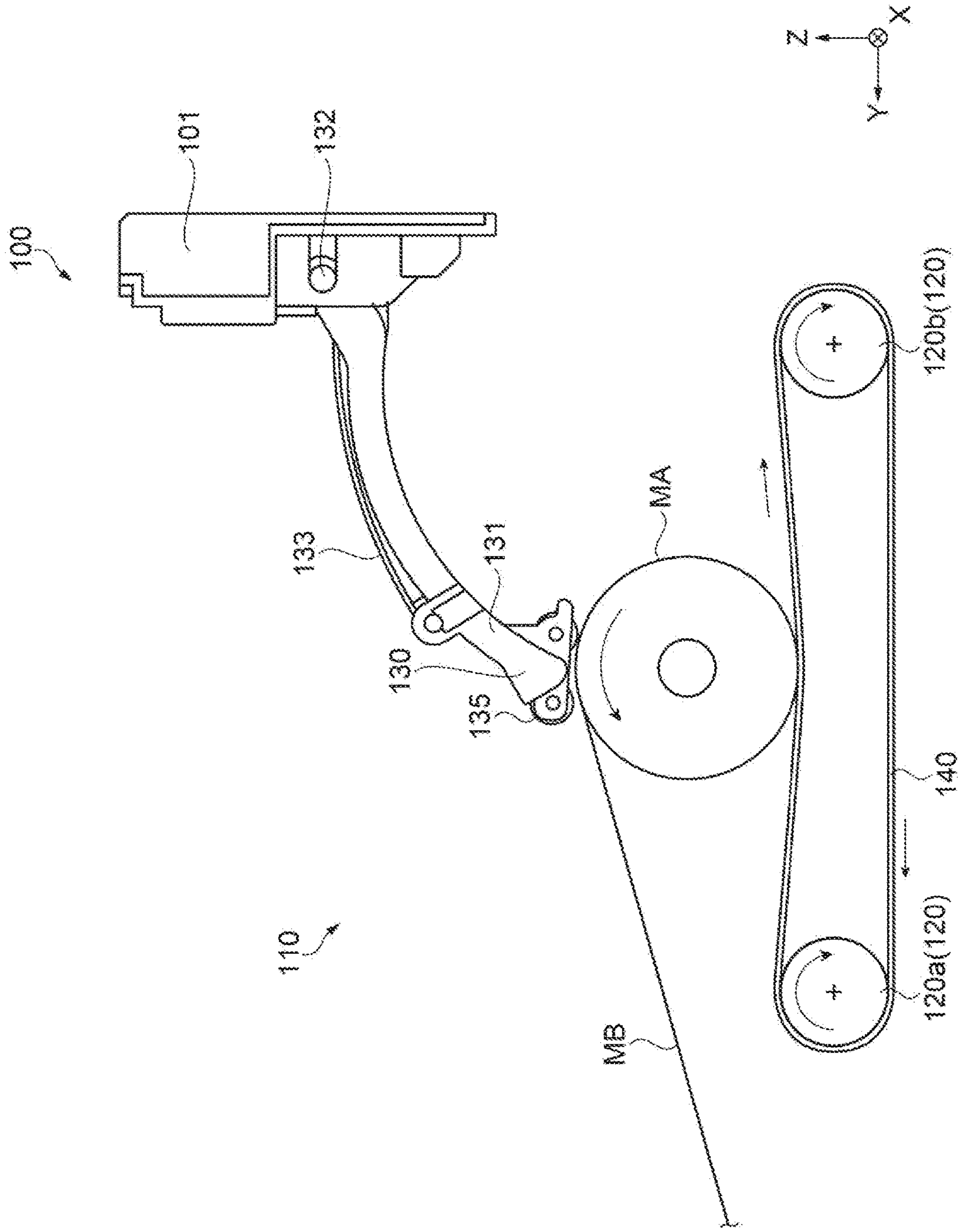
FIG. 5B is a schematic view illustrating a configuration of the medium supplying device according to the first embodiment.

As illustrated in FIGS. 4, 5A and 5B, a turning axis 132 extending in the direction along the X axis is provided at the end portion of the contact member 130 (the main body part 131) on one end side in the −Y direction. The end portion of the contact member 130 (the main body part 131) on the other end side in the +Y direction is turned about the turning axis 132 as the turning center and displaced in the vertical direction so as to make contact with the rolled medium MA.

The contact member 130 make contact with the outer peripheral surface of the rolled medium MA by being displaced following the change of the outer diameter of the rolled medium MA. An application member 133 that applies a downward force to the contact member 130 (the main body part 131) is provided. The application member 133 is a torsion spring, a coil spring or the like. The application member 133 of this embodiment is a torsion spring (double torsion spring) in which the fixed end is fixed to the end portion of the housing 101 in the −Y direction and the free end is disposed at the top surface of the main body part 131.

In this manner, a downward force of the contact member 130 (the main body part 131) is applied, and the rolled medium MA can be reliably pressed in accordance with the change of the outer diameter of the rolled medium MA. In addition, since the contact member 130 biases the rolled medium MA downward from above, the pressure to the supplying belt 140 is increased and the rotational force to the rolled medium MA can be ensured.

A roller 135 is provided at the end portion of the main body part 131 in the +Y direction. In this embodiment, two rollers 135 are provided. The roller 135 is held by a holder 134, and the holder 134 is disposed at the front end portion of the main body part 131. The roller 135 includes a shaft extending in the direction along the X axis, and rotates in a slave manner. Damages to the rolled medium MA can be suppressed by pressing the contact member 130 downward with the roller 135 in contact with the outer peripheral surface of the rolled medium MA.

In addition, the contact members 130 are coupled by a shaft 136. A through hole 137 is provided on the end portion side of the main body part 131 in the +Y direction, and the three contact members 130 are coupled by providing the rod-shaped shaft 136 through the through hole 137. In this manner, the three contact members 130 operate in unison, and, when, for example, the rolled medium MA is housed in the housing part 110, all contact members 130 can be easily displaced upward, and thus the workability can be improved.

Note that while the downward force is applied to the contact member 130 by the application member 133 in this embodiment, this configuration is not limitative. The contact member 130 may be displaced downward by its own weight, or a weight may be provided such that the contact member 130 can be displaced downward.

As illustrated in FIGS. 5A and 5B, when the pair of rollers 120 is driven into rotation clockwise, the supplying belt 140 is driven into rotation clockwise in linkage with that rotation. In this manner, the rolled medium MA supported by the supplying belt 140 is rotated counterclockwise, and the sheet MB fed from the rolled medium MA is supplied into the housing 11 of the recording device 10.

Here, for example, in the case where the rolled medium MA is directly supported by the pair of rollers 120, the first and second rollers 120*a* and 120*b* make direct contact with the outer peripheral surface of the rolled medium MA, and consequently a roller track may passively be left on the rolled medium MA. For example, in the case where special paper provided with an ink receptive layer on the surface is used as the sheet MB, the ink receptive layer is depressed at the portion that has made contact with the first and second rollers 120*a* and 120*b*, which results in the reflectance different from that of the portion that has not made contact with the first and second rollers 120*a* and 120*b*, and reduction in image quality.

In view of this, in this embodiment, by using the supplying belt 140, the outer peripheral surface of the rolled medium MA is brought into surface contact. That is, it is possible to increase the contact area for supporting the rolled medium MA. In this manner, the contact pressure on the rolled medium MA can be reduced while ensuring the rotational force (conveyance force) for the rolled medium MA, and thus the generation of the roller track on the rolled medium MA can be suppressed. Thus, the image quality can be improved by performing recording on the sheet MB with no roller track or the like.

In addition, in the medium supplying device 100, the rolled medium MA is supported at the region between the pair of rollers 120 (between the first roller 120*a* and the second roller 120*b*) in the supplying belt 140, and the rolled medium MA is not supported at the positions of the pair of rollers 120 (the first roller 120*a* and the second roller 120*b*) in the supplying belt 140. That is, the rolled medium MA is supported at the portion other than the portion where the supplying belt 140 and the pair of rollers 120 (the first roller 120*a* and the second roller 120*b*) make contact with each other in the supplying belt 140. The portion other than the portion where the supplying belt 140 and the pair of rollers 120 (the first roller 120*a* and the second roller 120*b*) make contact with each other is a portion (region) where a larger elastic force is obtained in the direction along the Z axis in the stretched supplying belt 140. In this embodiment, in both the state where the remaining amount of the rolled medium MA is large (FIG. 5A) and the state where the rolled medium MA has been used (supplied) and the roll diameter has been reduced (FIG. 5B), the rolled medium MA is supported at the region between the pair of rollers 120 in the supplying belt 140. In this manner, the pressure of the pair of rollers 120 is less applied to the rolled medium MA supported by the supplying belt 140, and thus the generation of the roller track on the supported rolled medium MA can be further suppressed.

Note that the size of the pair of rollers 120 in the direction along the Y axis (the distance between the first roller 120*a* and the second roller 120*b*) may be appropriately set in accordance with the size and/or the weight of the rolled medium MA used. In addition, the size of the supplying belt 140 in the direction along the X axis may be smaller or greater than the size of the rolled medium MA used in the direction along the X axis, and may be appropriately set. In addition, one supplying belt 140 or a plurality of the supplying belts 140 parallel to each other along the X axis may be provided.

In addition, a tension roller that applies a tensile force to the supplying belt 140 may be provided.

2. Second Embodiment

Next, a second embodiment will be described. Note that configurations identical to those in the first embodiment will be denoted by the same reference signs and redundant descriptions will be omitted.

Figure 6A:
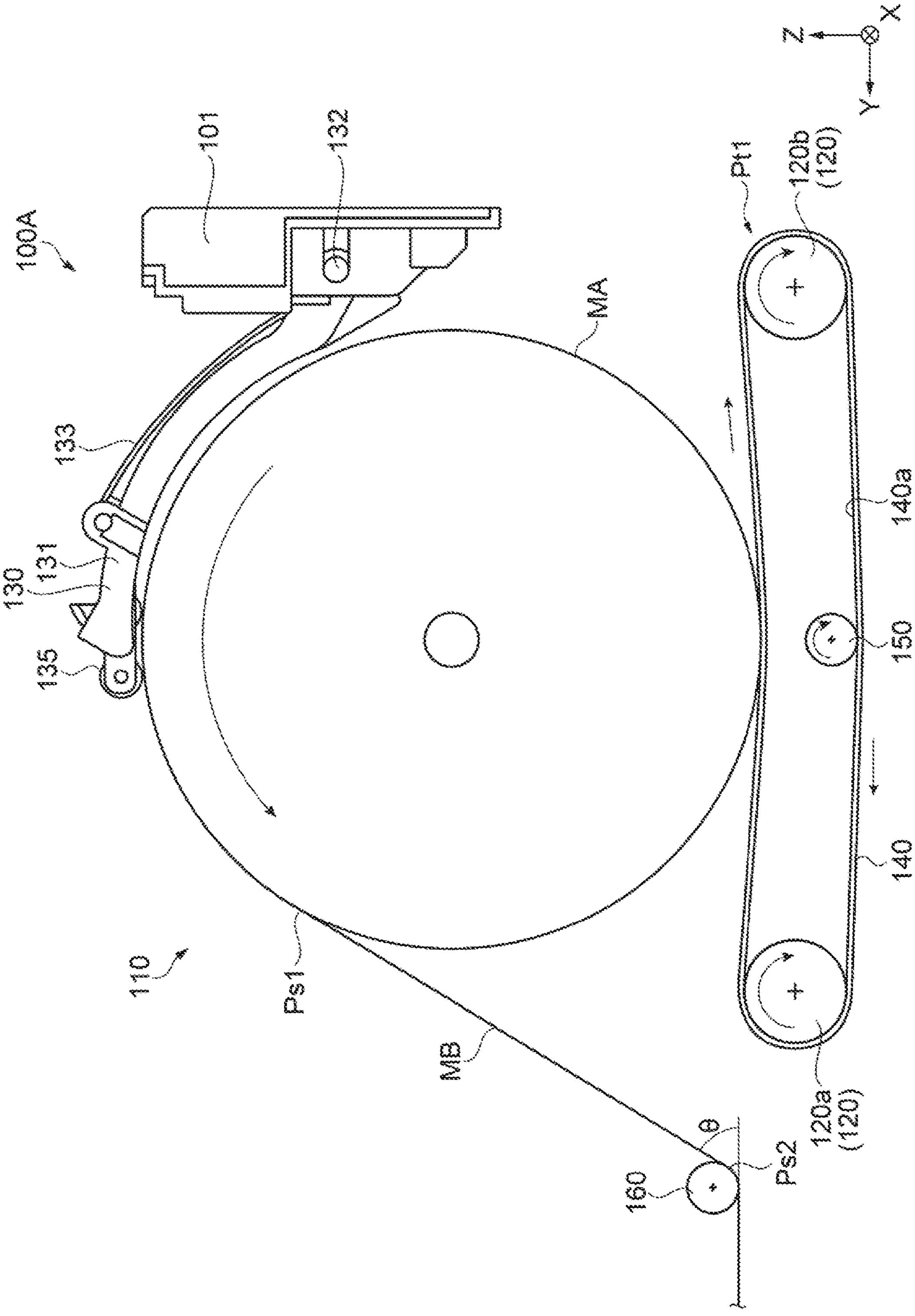
FIG. 6A is a schematic view illustrating a configuration of a medium supplying device according to a second embodiment.
Figure 6B:
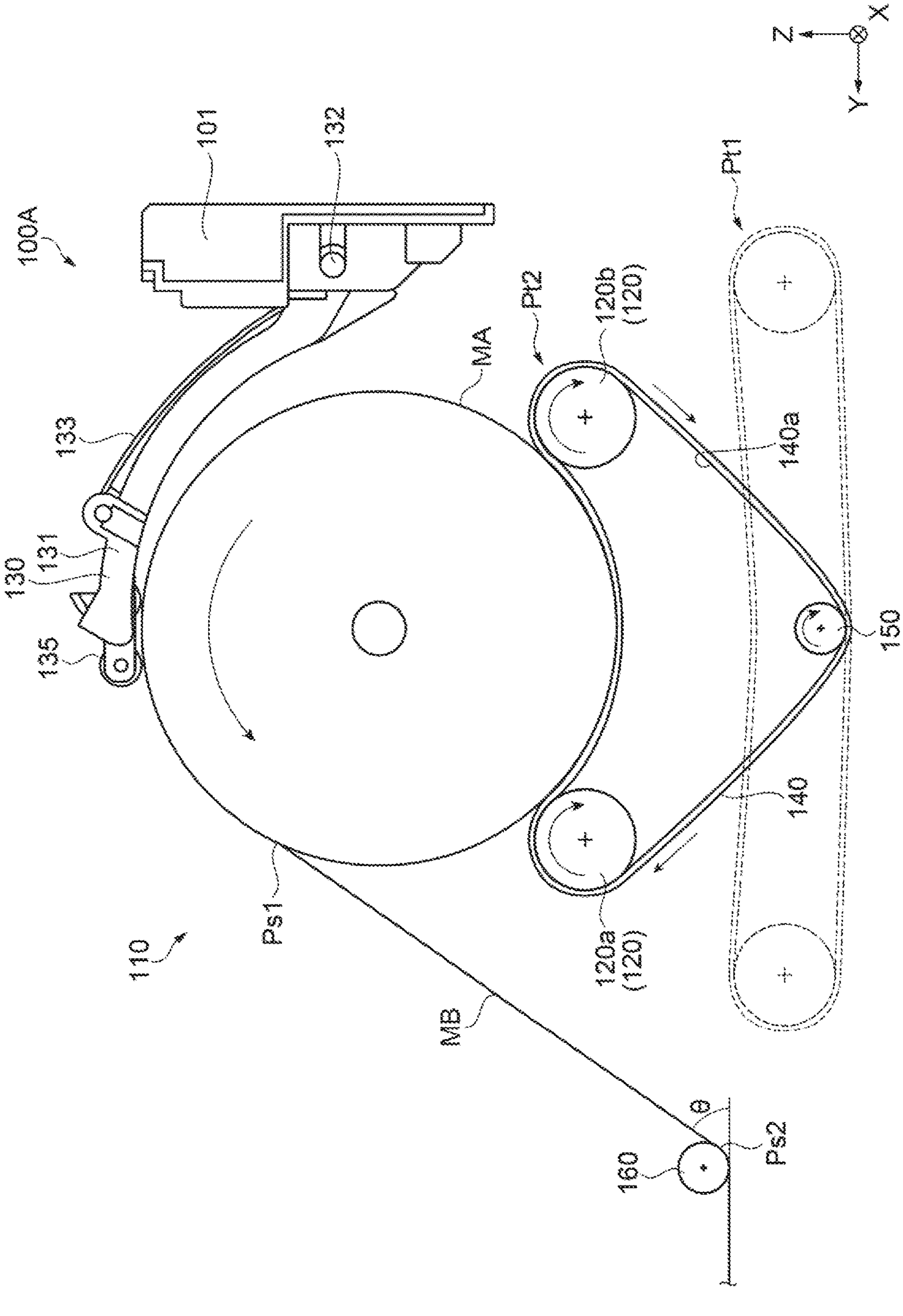
FIG. 6B is a schematic view illustrating a configuration of the medium supplying device according to the second embodiment.

As illustrated in FIGS. 6A and 6B, in the medium supplying device 100A of this embodiment, the pair of rollers 120 can be displaced to a first position Pt1 and a second position Pt2 higher than the first position Pt1. In addition, the displacement from the first position Pt1 to the second position Pt2 is stepwise. In this embodiment, as the weight decreases in accordance with the use state of the rolled medium MA, the pair of rollers 120 is gradually displaced upward from the first position Pt1. Springs that bias the first roller 120*a* and the second roller 120*b* upward are disposed at the shafts of the first roller 120*a* and the second roller 120*b*. As the weight of the rolled medium MA supported by the supplying belt 140 decreases, the first roller 120*a* and the second roller 120*b* are displaced upward with the spring force. In addition, with the spring, the pair of rollers 120 can be gradually displaced from the first position Pt1 to the second position Pt2. Note that it is possible to adopt a configuration in which the position of the pair of rollers 120 is displaced by using a mechanism such as a rack-pinion.

In addition, the medium supplying device 100A includes a roller 160 that makes contact with, from above, the sheet MB withdrawn from the rolled medium MA housed in the housing part 110. The roller 160 forms a supplying path for supplying the sheet MB into the housing 11 of the recording device 10. An angle θ between a horizontal plane and a straight line connecting the position (peeling position Ps1) where the sheet MB is peeled from the rolled medium MA and the position (contact position Ps2) where the roller 160 makes contact with the sheet MB is constant regardless of the change of the outer diameter of the rolled medium MA. Note that the constant angle θ means that a difference of a few degrees in angle is acceptable. The pair of rollers 120 is displaced upward as the roll diameter of the rolled medium MA decreases. In linkage with this, the rolled medium MA also moves upward. Thus, the peeling position Ps1 is substantially constant. The roller 160 is disposed in a fixed manner. In this manner, regardless of the use state of the rolled medium MA, the angle θ is maintained in a substantially constant manner. Thus, the sheet MB can be supplied in a stable state.

In addition, the medium supplying device 100A includes a tension roller 150 that applies a tensile force to the supplying belt 140 in the region opposite to the region that supports the outer peripheral surface of the rolled medium MA of the opposite two regions disposed between the pair of rollers 120 in the supplying belt 140. The tension roller 150 is disposed between the first roller 120*a* and the second roller 120*b*, and makes contact with an inner peripheral surface 140*a* of the supplying belt 140 provided around them. The tension roller 150 includes a shaft extending along the direction along the X axis. The position of the tension roller 150 is fixed. The diameter of the tension roller 150 is smaller than the diameter of the first roller 120*a* and the second roller 120*b*. At the first position Pt1, the tension roller 150 is disposed at a position slightly lower than the pair of rollers 120 (FIG. 6A). In this manner, a tensile force can be reliably applied to the supplying belt 140. On the other hand, at the second position Pt2, the pair of rollers 120 is displaced upward with respect to the tension roller 150 (FIG. 6B). In this manner, the tensile force of the supplying belt 140 is increased by the tension roller 150, the rotational force (conveyance force) of the supplying belt 140 for the rolled medium MA can be increased, and the rolled medium MA with the reduced weight can be reliably rotated. Note that the second position Pt2 of the pair of rollers 120 in FIG. 6B is merely an example, and when the rolled medium MA has been used and the weight has been further reduced, the second position Pt2 is further displaced upward.

In this embodiment, when the tension roller 150 is driven into rotation, the supplying belt 140 is driven into rotation. The first roller 120*a* and the second roller 120*b* rotate to follow the rotation of the supplying belt 140. The tension roller 150 does not move with respect to the pair of rollers 120, and thus can apply a stable driving force to the supplying belt 140 and stably drive the supplying belt 140 into rotation.

In addition, the distance between the pair of rollers 120 at the second position Pt2 is smaller than the distance between the pair of rollers 120 at the first position Pt1. More specifically, the distance between the first roller 120*a* and the second roller 120*b* in the direction along the Y axis at the second position Pt2 is smaller than the distance between the first roller 120*a* and the second roller 120*b* in the direction along the Y axis at the first position Pt1. The shaft of each of the first roller 120*a* and the second roller 120*b* is engaged with a guide member that is oriented obliquely upward so as to reduce the distance between the first roller 120*a* and the second roller 120*b*, and the first roller 120*a* and the second roller 120*b* are displaced obliquely upward with the spring force. At the second position Pt2, the distance between the pair of rollers 120 is reduced, and the tensile force of the supplying belt 140 is held by the tension roller 150. This regulates the range where the rolled medium MA moves on the supplying belt 140 in the direction along the Y axis at the second position Pt2, and thus the fluttering of the rolled medium MA can be suppressed.

As illustrated in FIG. 6A, at the first position Pt1, the outer peripheral surface of the rolled medium MA is supported at the region between the pair of rollers 120 in the supplying belt 140. That is, the rolled medium MA in unused or lightly used state is supported at the portion (region) other than the portion where the pair of rollers 120 (the first roller 120*a* and the second roller 120*b*) and supplying belt 140 in supplying belt 140 make contact with each other, and where the elastic force of the stretched supplying belt 140 can be obtained. In this manner, the generation of the roller track on the rolled medium MA can be suppressed.

In addition, as illustrated in FIG. 6B, at the second position Pt2, the outer peripheral surface of the rolled medium MA is supported at the positions of the pair of rollers 120 and the region therebetween in the supplying belt 140. That is, the rolled medium MA that has been used (supplied) and has a reduced roll diameter (reduced weight) is supported at a portion (region) including a portion where the supplying belt 140 and the pair of rollers 120 (the first roller 120*a* and the second roller 120*b*) make contact with each other in the supplying belt 140. In this manner, the range where the rolled medium MA moves in the direction along the Y axis on the supplying belt 140 at the second position Pt2 is regulated, and thus the fluttering of the rolled medium MA can be reliably suppressed. Note that regarding the rolled medium MA with the reduced roll diameter, its weight is small, and therefore the influence of the roller track of the pair of rollers 120 is small. Note that at the second position Pt2, the outer peripheral surface of the rolled medium MA may be supported only at the region between the pair of rollers 120 without supporting the outer peripheral surface of the rolled medium MA at the position of the pair of rollers 120 in the supplying belt 140. Also with this configuration, the distance between the pair of rollers 120 in the Y-axis direction is smaller than at the first position Pt1, and thus the flattering of the rolled medium MA on the supplying belt 140 can be suppressed.

In addition, the contact member 130 of this embodiment makes contact with the outer peripheral surface of the rolled medium MA at a constant position regardless of the change of the outer diameter of the rolled medium MA. The contact member 130 makes contact with the outer peripheral surface of the upper part of the rolled medium MA. The pair of rollers 120 is displaced upward as the roll diameter of the rolled medium MA decreases. The rolled medium MA is displaced upward in linkage with the upward displacement of the pair of rollers 120. Thus, the position, in the direction along the Z axis, of the roller 135 of the contact member 130 that makes contact with the outer peripheral surface of the rolled medium MA is substantially constant. In this manner, the contact state of the contact member 130 with respect to the rolled medium MA is stabilized, and the rolled medium MA can be biased with constant pressing.

As described above, according to this embodiment, the pair of rollers 120 is displaced from the first position Pt1 to the second position Pt2 in accordance with the use state of the rolled medium MA, and thus the positional relationship between the supplying path of the sheet MB fed from the rolled medium MA and the rolled medium MA is maintained at a constant manner, and, the sheet MB can be stably supplied.

Note that while the upward displacement is made such that the distance between the pair of rollers 120 at the second position Pt2 is smaller than the distance between the pair of rollers 120 at the first position Pt1 in this embodiment, this configuration is not limitative. For example, it is possible to adopt a configuration in which the tension roller 150 is omitted and the distance between the pair of rollers 120 is the same for the first position Pt1 and the second position Pt2. In this case, one of the pair of rollers 120 is a driving roller. This can also maintain the supplying path of the sheet MB in a constant manner.

What is claimed is:

1. A medium supplying device comprising:

a housing part configured to house a rolled medium obtained by winding a sheet;

a pair of rollers disposed at a predetermined interval in the housing part; and a supplying belt with an endless annular shape provided around the pair of rollers and configured to rotate along with rotation of the pair of rollers, wherein an outer peripheral surface of the rolled medium is supported with the supplying belt, the supplying belt is driven into rotation to rotate the rolled medium to supply the sheet, and the pair of rollers is configured to be displaced to a first position and a second position higher than the first position.

2. The medium supplying device according to claim 1, wherein the rolled medium is supported at a region between the pair of rollers in the supplying belt; and the rolled medium is not supported at positions of the pair of rollers in the supplying belt.

3. The medium supplying device according to claim 1, comprising a contact member in the housing part, the contact member being configured to make contact with the outer peripheral surface of the rolled medium from a position opposite to a position where the outer peripheral surface of the rolled medium is supported by the supplying belt.

4. The medium supplying device according to claim 3, wherein the contact member makes contact with the outer peripheral surface of the rolled medium by being displaced following a change of an outer diameter of the rolled medium.

5. The medium supplying device according to claim 1, comprising a tension roller configured to apply a tensile force to the supplying belt in a region opposite to a region where the outer peripheral surface of the rolled medium is supported of opposite two regions disposed between the pair of rollers in the supplying belt.

6. The medium supplying device according to claim 5, wherein the supplying belt is driven into rotation when the tension roller is driven into rotation.

7. The medium supplying device according to claim 1, wherein a distance between the pair of rollers at the second position is smaller than a distance between the pair of rollers at the first position.

8. The medium supplying device according to claim 1, wherein at the first position, the outer peripheral surface of the rolled medium is supported at a region between the pair of rollers in the supplying belt; and at the second position, the outer peripheral surface of the rolled medium is supported at positions of the pair of rollers and the region between the pair of rollers in the supplying belt.

9. The medium supplying device according to claim 1, wherein displacement from the first position to the second position is stepwise displacement.

10. The medium supplying device according to claim 1, comprising a contact member in the housing part, the contact member being configured to make contact with the outer peripheral surface of the rolled medium from a position opposite to a position where the outer peripheral surface of the rolled medium is supported by the supplying belt, wherein the contact member makes contact with the outer peripheral surface of the rolled medium at a constant position regardless of a change of an outer diameter of the rolled medium.

11. The medium supplying device according to claim 1, comprising a roller configured to make contact with, from above, the sheet withdrawn from the rolled medium housed in the housing part, wherein an angle between a horizontal plane and a straight line connecting a position where the sheet is peeled from the rolled medium and a position where the roller makes contact with the sheet is constant regardless of a change of an outer diameter of the rolled medium.

12. A recording device comprising:

the medium supplying device according to claim 1; and a recording part configured to perform recording on a sheet supplied from the medium supplying device.

* * * * *